Patented Oct. 12, 1948

2,451,126

UNITED STATES PATENT OFFICE 2,451,126

TRANSLUCENT SHEET FOR REPRODUCTION PURPOSES

Raymond B. Stringfield, Los Angeles, Calif., and Thomas R. Miles, Fort Worth, Tex., assignors to Consolidated Vultee Aircraft Corporation, San Diego, Calif., a corporation of Delaware No Drawing. Application January 15, 1945, Serial No. 572,984

2 Claims. (Cl. 260—37)

This invention pertains to a translucent sheet adapted to be drawn upon and to transmit light for the reproduction of drawings on its surface.

In industrial drafting practice, it is frequently necessary or desirable to be able to reproduce drawings with great accuracy upon another surface such as a sheet of steel or aluminum which is to be used for reference purposes, cut for a template or later formed into a finished article. Various methods of accomplishing this reproduction have been described by one of the inventors in various magazine articles (Thomas Miles, Product Engineering, 15, 130, Feb. 1944; 15, 190, Mar. 1944; 15, 276, Apr. 1944; 15, 327, May 1944), and are satisfactory for certain purposes. These usually involve making the original drawing on a sheet of metal which has been coated with a fluorescent lacquer and reproducing from this surface by utilizing the after glow following X-ray exposure.

There are, however, numerous occasions where it is desirable to have the original drawing on a transparent or translucent sheet so that direct contact prints may be made. Ordinary tracing paper or cloth is unsuitable as the dimensions change rapidly with changes in the moisture content of the atmosphere. Available plastic sheets, such as cellulose acetate or methyl methacrylate, are unsatisfactory, cellulose acetate being dimensionally unstable from the standpoint of both moisture absorption and evaporation of plasticizers, and both cellulose acetate and methyl methacrylate having thermal coefficients of expansion much greater than those of the steel or aluminum on which it is usually desired to reproduce the drawing. Glass is too heavy to handle in a section thick enough to have satisfactory strength, and has a thermal coefficient of expansion much less than those of steel and aluminum. Ordinary paper or cotton fabric laminated phenolic sheets, which have a thermal coefficient of expansion approximately that of aluminum, are often not sufficiently translucent to permit satisfactory reproduction, and are subject to dimensional changes with variations in atmospheric humidity.

An object of our invention is to provide a translucent sheet formed of plastic for reproduction purposes and which is substantially unaffected by moisture.

A further object of our invention is to provide a translucent sheet formed of plastic for reproduction purposes which has a predetermined thermal coefficient of expansion.

Another object of our invention is to provide translucent sheets of plastic for reproduction purposes having substantially the same thermal coefficient of expansion as the aluminum, magnesium or steel parts to be fabricated from the designs thereon.

Another object of our invention is to provide a translucent sheet for reprodutcion purposes which is substantially unaffected by moisture, and which comprises a selected plastic having a calculated content of filler material, either as particles, fibers or fabric, such that the resulting thermal coefficient of expansion of the composite sheet approximates that of the material on which a drawing provided on the plastic sheet is to be reproduced.

Another object of this invention is to provide a translucent sheet of plastic for reproduction purposes, and having the surface thereof modified to render it suitable for either pencil, ink, lacquer or other drawing medium, and which sheet may be either comparatively flexible or comparatively rigid.

Other objects and features will be readily apparent to those skilled in the art from the discussion and examples detailed hereinafter.

The principles involved in compounding materials of different thermal coefficients of expansion to produce a product having a definite intermediate coefficient have been studied by the National Bureau of Standards, Washington, D. C., and are explained in the Advance Restricted Report of the National Advisory Committee for Aeronautics, published in June 1942, and titled "The Problem of Thermal Expansion Stresses in Reinforced Plastics." For a two component system, the following equation can be used:

$$a_r = \frac{\dfrac{a_1 P_1 E_1}{d_1} + \dfrac{a_2 P_2 E_2}{d_2}}{\dfrac{P_1 E_1}{d_1} + \dfrac{P_2 E_2}{d_2}}$$

where
$a$ = coefficient of linear thermal expansion
$d$ = density
$E$ = Young's modulus of elasticity
$P$ = fraction or percent by weight For the materials of most common interest for our purposes, the following constants are tabulated:

*Table I*

| | a | d | E |
|---|---|---|---|
| Phenol-formaldehyde resin | $60\times10^{-6}/°C$ | 1.30 | $1.0\times10^6$ p. s. i. |
| Polyvinylidene chloride | $190\times10^{-6}/°C$ | 1.70 | $0.2\times10^6$ p. s. i. |
| Polyvinyl chloride-acetate | $70\times10^{-6}/°C$ | 1.35 | $0.4\times10^6$ p. s. i. |
| Polymethyl methacrylate | $80\times10^{-6}/°C$ | 1.18 | $0.4\times10^6$ p. s. i. |
| Polystyrene | $70\times10^{-6}/°C$ | 1.06 | $0.4\times10^6$ p. s. i. |
| Polyamide resin (Nylon) | $100\times10^{-6}/°C$ | 1.14 | $0.45\times10^6$ p. s. i. |
| Aluminum alloy 24S | $23\times10^{-6}/°C$ | 2.77 | $10.3\times10^6$ p. s. i. |
| Magnesium alloy J1 | $26\times10^{-6}/°C$ | 1.80 | $6.5\times10^6$ p. s. i. |
| Steel, SAE 1010 | $11.7\times10^{-6}/°C$ | 7.85 | $28\times10^6$ p. s. i. |
| Glass fiber | $7.44\times10^{-6}/°C$ | 2.56 | $11\times10^6$ p. s. i. |

Using this table of properties, we may calculate the effect of various percentages of glass fiber upon the thermal coefficient of expansion of some of the most useful resins suitable for making translucent sheets in the practice of our invention.

*Table II*

| Glass fiber | Resin | Calculated Coeff. of Thermal Expansion ($\times10^{-6}/°C$.) | | |
|---|---|---|---|---|
| | | Phenolic | Polyamide Resin | Polyvinylidene Chloride |
| *Percent* | *Percent* | | | |
| 100 | 0 | 7.44 | 7.44 | 7.44 |
| 50 | 50 | 15.4 | 16.2 | 12.3 |
| 25 | 75 | 26.5 | 27.4 | 21 |
| 10 | 90 | 40 | 49 | 43 |
| 0 | 100 | 60 | 100 | 190 |

By plotting these, it can be seen that to meet the coefficient of expansion of 24S aluminum alloy, a mixture of 68 parts by weight of a phenolic resin such as phenol-formaldehyde resin with 32 parts by weight of glass fibers, or of 67 parts of a polyamide such as nylon with 33 parts of glass fibers, or of 78 parts of polyvinylidene chloride with 22 parts of glass fibers, would theoretically be required. Likewise the coefficient of expansion of steel may be met with a mixture of 34 parts of phenol-formaldehyde resin and 66 parts of glass fibers, or of 29 parts of a polyamide resin and 71 parts of glass fibers, or of 35 parts of polyvinylidene chloride and 65 parts of glass fibers. However, for most purposes, it is not necessary to exactly meet the coefficients of the materials on which reproduction is to be made, as there will seldom be a difference of more than 30° F. between the temperature at which a drawing is made and the temperature at which it is used, and difference of some .0003 inch per inch can be tolerated. This is equivalent to a difference in coefficients between the materials of $\pm10\times10^{-6}$° C. On this basis, the following table gives the percentage range of suitable mixtures to give products for use with aluminum and steel.

*Table III*

| | For Use With— | | | |
|---|---|---|---|---|
| | Aluminum | | Steel | |
| | Per Cent Resin | Per Cent Glass Fibers | Per Cent Resin | Per Cent Glass Fibers |
| Phenolic | 83–51 | 17–49 | Approx. 65 | Approx. 35 |
| Polyamide | 81–41 | 19–59 | Approx. 63 | Approx. 37 |
| Polyvinylidene chloride | 86–54 | 14–46 | Approx. 76 | Approx. 24 |

Inasmuch as variations in the percentages of the raw materials used in making the resins, and in their degree of polymerization will affect the modulus of elasticity and thermal coefficient of expansion of the finished product, and as variations in composition also affect these properties for glass and other inorganic materials which can be used as fillers, it is necessary for accurate work to determine these properties experimentally for the particular materials used or for the translucent sheets produced from them.

The range of proportions given for the phenolic resin, Table III above, are within the range wherein glass fabric can be impregnated with a phenolic resin and cured to a strong and yet somewhat flexible and shock resistant sheet. A sheet having this composition is translucent and permits the passage of light so that photographic prints can be made directly upon a steel or aluminum surface which has been sensitized to thereby reproduce any design which may be drawn or printed on the surface of the plastic sheet. Such sheets are practically unaffected by changes in the moisture content of the atmosphere. The surface may be modified by sanding or by coating with a special varnish or lacquer carrying abrasive particles to enable it to better take pencil marks, or it may be coated with a special varnish or lacquer to give suitable wetting properties with the ink or colored lacquer to be used.

Another useful mixture shown in Table III is that of powdered glass or glass fibers with polyvinylidene chloride. This is a flexible resin having a high coefficient of expansion which by proper compounding can be made into a sheet having the approximate thermal coefficients of aluminum or steel. This particular sheet is entirely unaffected by the moisture content of the atmosphere or even by immersion in water.

A similar composition can be formulated for polyamide resin (nylon) utilizing percentages as shown in Table III. A sheet so formed is particularly resistant to oil.

The possibilities of modifying the surface to better adapt it to take pencil, ink, lacquer, etc., apply to these compounded sheets. The use of a flexible thermoplastic such as polyvinylidene chloride or a polyamide (nylon) permits the compounding of a sheet which can be rolled for handling or storage purposes, and which is still of such dimensional stability as to permit its use for accurate drawings. If desired, materials of extremely low thermal coefficients such as fused quartz or fused aluminum oxide can be used as fillers. In some cases it may be desirable to heat, chemically clean, or otherwise treat the surface of the filler in order to facilitate wetting of the surface by the resin. Obviously, many different resins and fillers can be used, and our invention is not limited to those that have been named.

As specific examples for effecting the present invention, we cite the following:

Example 1

Glass fabric is heated in an air oven for 2 hours at 200° C. to partially volatilize and destroy the lubricant used in its manufacture, and is then impregnated with a heat-reactive phenol-formaldehyde resin by passing through a solution of the resin in alcohol and evaporating the solvent. By varying the viscosity of the phenol-formaldehyde solution and the speed with which the glass fabric passes through it, it is possible to vary the relative proportions of glass fabric to phenolic resin in the impregnated product over a wide range, and it is comparatively simple to adjust the formulation for a particular resin used so that the dry product will carry 32 percent by weight of glass fabric and 68 percent by weight of phenolic resin, which will then have substantially the thermal coefficient of expansion of aluminum. The dried, impregnated fabric is then cut into sheets of suitable size, several sheets stacked together to give the desired thickness, and cured between polished stainless steel sheets between the heated platens of a hydraulic press until polymerization of the resin has been substantially completed. The resulting sheet is translucent and of a very light brown color, and after a light sanding of the surface with fine sandpaper, is ready for use for drawing with either pencil or ink. A similar sheet can be made by impregnating glass fabric with either urea-formaldehyde resin or melamine-formaldehyde resin in substantially the same manner and proportions.

*Example 2*

67 parts of a polyamide resin of melting point over 450° F. are melted in a closed kettle in an inert atmosphere of nitrogen and 33 parts of finely powdered glass incorporated by mixing. The compounded mass is then extruded through a Monel metal slit in the thickness desired onto the polished and slowly revolving surface of a water cooled drum approximately ten feet in diameter, where it is rapidly chilled and the solidified sheet removed. By using a special lacquer-type ink, it is possible to draw upon this sheet with no further preparation, and the finished drawing is of substantially the same thermal coefficient of expansion as aluminum and sufficiently tough to stand handling and flat storage without distortion.

*Example 3*

35 parts of polyvinylidene chloride are softened on the rolls of a hot two-roll mixing mill at approximately 350° F. and 65 parts of glass fibers cut to approximately ¼ inch length incorporated by the differential action of the rolls. The hot mass is then transferred to a three roll calender and sheeted out into a sheet approximately .032 inch thick which is carried away on a belt conveyor for a sufficient distance to air-cool, and is then rolled into rolls of convenient size. This material has substantially the thermal coefficient of expansion of steel, and is capable of being drawn upon with special lacquer type inks without further preparation, and the drawings used to print directly upon sheets of steel carrying sensitized emulsions.

While certain preferred embodiments of the invention have been specifically disclosed, it is understood that the invention is not limited thereto, as many variations will be readily apparent to those skilled in the art, and the invention is to be given to broadest possible interpretation within the terms of the following claims.

We claim:

1. A translucent sheet adapted for use in making templates, and comprising a mixture of 35 parts by weight of polyvinylidene chloride with 65 parts by weight of glass fibers so that the resulting thermal coefficient of expansion is about $11.7 \times 10^{-6}/°C$.

2. A translucent sheet adapted for use in making templates, and comprising a mixture of from 54–86% by weight of polyvinylidene chloride with the remainder glass fibers.

RAYMOND B. STRINGFIELD.
THOMAS R. MILES.

REFERENCES CITED

The following references are of record in the file of this patent:

UNITED STATES PATENTS

| Number | Name | Date |
|---|---|---|
| 2,196,033 | Schuhmann | Apr. 2, 1940 |
| 2,196,579 | Reinhardt | Apr. 9, 1940 |
| 2,311,613 | Slayter | Feb. 16, 1943 |
| 2,344,733 | Ripper | Mar. 21, 1944 |
| 2,354,110 | Ford et al. | July 18, 1944 |
| 2,367,880 | Lindh | Jan. 23, 1945 |